United States Patent [19]

Dorfeld

[11] 4,277,522
[45] Jul. 7, 1981

[54] COATING GLASS-CERAMIC SURFACES

[75] Inventor: William G. Dorfeld, Corning, N.Y.

[73] Assignee: Corning Glass Works, Corning, N.Y.

[21] Appl. No.: 756,154

[22] Filed: Jan. 3, 1977

[51] Int. Cl.³ ............................................. B05D 3/12
[52] U.S. Cl. ....................................... 427/292; 65/33; 65/60 R; 65/61; 427/397.7
[58] Field of Search .............. 65/28, 60 R, 60 C, 120, 65/33, (U.S. only), 61; 427/292, 383 B, 372 A, 376 A, 383.5, 397.7, 376.2; 428/432, 433, 428

[56] References Cited

U.S. PATENT DOCUMENTS

| | | | |
|---|---|---|---|
| 3,113,009 | 12/1963 | Brown et al. | 65/61 X |
| 3,220,870 | 11/1965 | Loehrke | 65/33 X |
| 3,775,154 | 11/1973 | Grego et al. | 428/432 X |
| 4,047,292 | 9/1977 | Shatter | 65/61 X |

FOREIGN PATENT DOCUMENTS 2362896   9/1974   Fed. Rep. of Germany ........... 427/292

*Primary Examiner*—Evan K. Lawrence
*Attorney, Agent, or Firm*—William J. Simmons, Jr.

[57] ABSTRACT

A process for enhancing the adhesion of coatings applied to the surfaces of glass-ceramic articles. The surface area to be coated is roughened before the article is completely cerammed. When the article is subjected to elevated temperatures for the purpose of converting the green glass to a glass-ceramic, flaws produced by the abrasion step are healed. The coating can be applied before or after the ceramming step.

6 Claims, No Drawings

COATING GLASS-CERAMIC SURFACES

BACKGROUND OF THE INVENTION

This invention relates to a method of making thermally durable glass-ceramic articles having strongly adherent coatings thereon.

The term "glass-ceramic" refers to a polycrystalline ceramic prepared by the controlled crystallization of a glass in situ. The invention of such materials has enabled the formation of intricately-shaped polycrystalline articles by forming "green glass" into the desired shape and thereafter ceramming the green glass article to convert it to a glass-ceramic. The ceramming step conventionally involves heating the green glass article to an elevated temperature, e.g. a temperature in the range of about 650°–800° C., to cause nucleation or the formation of nuclei and subsequently heating the article to a higher temperature, e.g. a temperature in the range of about 800°–1175° C. to cause crystallization and growth of crystals. The resultant glass-ceramic material is known for its good mechanical and thermal durability. For additional information pertaining to the formation of glass-ceramic materials, reference may be made to U.S. Pat. Nos. 2,920,971; 3,148,994 and 3,157,522. For example, U.S. Pat. No. 3,157,522 indicates that the nucleation step can be performed immediately after the article is formed while the article is still hot. Thus, the shaped green glass article may be cooled to a temperature in the range of 650°–800° C. and held at that temperature for a period of time, usually between about 2 hours and about 10 minutes, depending upon the temperature. This type of nucleation step may be performed in the method of the present invention when the article is to be abraded while in the nucleated state. Furthermore, the abraded article may be subjected to two or more crystal growth temperature schedules in accordance with the aforementioned U.S. Pat. No. 3,148,994. However, it is to be noted that the method of the present invention is not limited to any particular ceramming schedule, and any ceramming schedule may be employed since all such schedules are capable of alleviating damage caused by a prior, surface abrasion step.

Glass-ceramic articles have been coated with electrically and/or thermally conductive material to form such devices as resistors, heaters, stovetop cooking units, cookware and the like. The following references are illustrative of these applications: U.S. Pat. Nos. 3,330,940; 3,813,520; 3,848,111 and 3,883,719 and my U.S. Patent Application Ser. No. 727,893, entitled "Low TCR Resistor" filed on Sept. 29, 1976. Any of the articles disclosed in the aforementioned references may be subjected to temperature changes which can cause the formation of stress therein which can result in breakage of the article and/or separation of the conductive coating from the glass-ceramic substrate.

Although glass-ceramic materials have been commonly employed as cookware, a primary disadvantage of such ware is the low thermal conductivity thereof. For example, direct contact of glass-ceramic cookware with burner elements is disadvantageous in that food disposed therein can be burned if it is immediately above the burner element, and food which is only a short distance away, but not directly over a burner element, may be undercooked.

The application of coatings to glasses and glass-ceramics is widely employed to impart desirable physical properties such as thermal and electrical conductivity thereto, and many processes for applying such coatings are known. U.S. Pat. Nos. 3,523,013; 3,220,870; 3,296,012; 3,914,517 and 3,741,780 disclose methods of providing glass-ceramic substrates with conductive coatings.

The principal problems in the art of metal-coating glass-ceramic cookware arise out of the substantial differences in thermal expansion behavior between the conventional glass-ceramic materials used for the fabrication of cookware and more highly conductive materials which might be considered for use as coatings in combination with these glass-ceramics. For example, glass-ceramic materials typically employed for cookware fabrication exhibit rather low coefficients of thermal expansion, e.g., on the order of $10-25 \times 10^{-7}/°C.$, whereas aluminum, for example, which has a desirable thermal conduction capability, has a coefficient of thermal expansion of about $230 \times 10^{-7}/°C.$ Theoretical stresses which may arise as a result of this expansion mismatch over the typical temperature range of use of an aluminum metal-glass-ceramic composite cooking vessel approach 700 MPa. Increases in the thermal expansion of the glass-ceramic material to alleviate this expansion mismatch are not possible without sacrificing the excellent thermal shock resistance of this material, a major desirable feature of glass-ceramic cookware. Even silicon, which has a coefficient of thermal expansion of about $35 \times 10^{-7}/°C.$, is subjected to stresses which tend to cause delamination to occur when silicon-coated cookware is subjected to thermal cycles normally encountered in cooking. Moreover, such glass-ceramic ware possesses an extremely smooth surface that is not normally receptive to many coating materials. One example of a material that can be self-bonding to smooth glass-ceramic surfaces is aluminum, provided that it is properly applied, an example of such a self-bonding material being described in U.S. Patent Application Ser. No. 712,479 entitled "Process for Making Aluminum-Coated Glass-Ceramic Cooking Vessel" filed Aug. 9, 1976.

Three techniques conventionally employed to improve adhesion of non-bonding coatings are surface roughening, substrate preheating, and precoating the substrate with a material which is self-bonding and which is compatible with the desired coating material. However, each of these techniques possesses disadvantages which tend to discourage its utilization. For example, subjecting glass-ceramic articles to high preheat temperatures was found to effect coating bonds of marginal strength, but all but the thinnest coatings spalled as the coated articles cooled. Vacuum deposited films of chromium having thicknesses of about 500 Å formed good bonding layers between glass-ceramic substrates and silicon coatings, but the vacuum deposition technique for applying such films is unduly expensive. It is knwon that although surface roughening of glass-ceramic substrates improves the adhesion of subsequently applied thermally conductive coatings, such roughening introduces undesirable stress raisers and degrades the thermal durability properties of the glass-ceramic. For example, glass-ceramic skillets, the bottom surfaces of which were roughened prior to applying thermally conductive coatings thereto, could not pass a thermal downshock test because of the damage imparted thereto by the roughening procedure.

SUMMARY OF THE INVENTION

It is therefore an object of the present invention to provide a method for enhancing the adhesion of both self-bonding and non-selfbonding coatings on glass-ceramic substrates.

Another object of the present invention is to provide an improved process for manufacturing metal-coated cookware which overcomes many of the disadvantages of prior art processes for producing such ware.

Other objects and advantages of the invention will become apparent from the following summary and detailed description thereof.

The present invention generally pertains to a method for coating a surface of a glass-ceramic article. Such a method is often carried out by abrading the surface of the finished glass-ceramic article and then applying a coating to the abraded surface. In accordance with the present invention the surface abrading step is characterized in that it comprises abrading the surface prior to completely ceramming the glass-ceramic material. Thereafter, the article is subjected to heat treatment to complete the conversion of the green glass to a glass-ceramic material and to simultaneously heal that damage which was caused by the surface abrading step.

DETAILED DESCRIPTION

The method of the present invention will be described by reference to certain specific embodiments thereof whereby glass-ceramic articles are provided with strongly adherent coatings. These articles may consist of any glass-ceramic material which can be formed by pressing or otherwise shaping the green glass into the final shape and thereafter subjecting the green glass to elevated temperatures to cause nucleation and growth of crystals in situ. The resultant material consists of a multiplicity of inorganic crystals dispersed in a glassy matrix which consists essentially of the uncrystallized glass.

Articles made by the method of the present invention possess good mechanical and thermal durability. The tests described hereinbelow may be employed to ascertain the durability of an article coated in accordance with the method of this invention.

A standard test for adhesion consists of bonding circularly shaped plugs to opposite sides of the article with a suitable adhesive such as an epoxy resin cement. The plugs are held in an alignment fixture to ensure the axial alignment thereof until the cement cures. A force is then applied to the two plugs which tends to pull them apart. The load is steadily increased until failure occurs at the substrate-coating interface.

Thermal durability is determined by two types of quenching experiments. A simple thermal downshock test is performed by rapidly immersing a coated article which has been heated to about 500° C. into cold water which is at a temperature of about 15° C. In this test, thermal gradients are predominantly normal to the surface. It is believed that conventional borosilicate glass ovenware is unable to withstand a 500° C. to cold water downshock test since the expansion coefficient thereof is too high for the thickness of the glass at the heel of such ware.

"Dunker" testing subjects an article to a different set of thermal conditions. During this test, a coated article is heated on an electric burner for 20 minutes to an inside surface temperature of 400°–450° C. and is then lowered edge first into circulating cold water. In this case thermal gradients can develop a component along the heel and bottom of an article of cookware which is parallel to the surface.

Attempts have been made to coat glass-ceramic substrates with various materials to produce printed circuits, thermally conductive cookware, resistors, heaters and the like. Such coatings generally adhere poorly to the surface of the glass-ceramic material due to the lack of an effective anchorage in the surface of the material which is normally smooth and substantially non-porous. For example, adherent silicon coatings of thicknesses greater than about 0.05 cm applied with preheat temperatures less than 600° C. cannot be obtained on a smooth, as-pressed surface of a glass-ceramic article of the type described in U.S. Pat. No. 3,157,522. Although an apparent bond is formed as the silicon is sprayed onto the surface, it is not strong enough to withstand the stresses which are generated by differential contraction of the coating as the article cools to room temperature. Roughening a surface of a glass-ceramic substrate improves the adhesion of a coating to that surface, but it also produces mechanical damage in the substrate which results in a degradation of the physical and thermal properties thereof.

In accordance with the present invention such mechanical damage is healed by abrading the article before it is completely cerammed so that the subsequent heat treatment required to complete the ceramming step heals the damage previously introduced by the mechanical abrasion. High temperature coating materials can generally be applied to the substrate at any time after the surface has been abraded. Thus, a green glass article can be mechanically roughened, coated while still in the green glass state and then cerammed, or the roughened green glass article can be nucleated, coated and then cerammed. Alternatively, the article can be roughened while in either the green glass or the nucleated state, and it can thereafter be cerammed and then coated. Finally, the article can be roughened in the nucleated state, coated and then cerammed. Obviously, the coating material must be able to withstand the high temperatures of the ceramming cycle if it is applied before ceramming occurs. In accordance with the teachings of the aforementioned U.S. Pat. No. 3,157,522, the minimum ceramming temperature is 800° C., and most ceramming processes for manufacturing glass-ceramic cookware require a minimum temperature of about 900° C.

If the coating is to be applied to the article while it is in the green glass or nucleated state, the coating material must be able to withstand the high temperature to which it will be subjected during the crystal growth process. High temperature materials such as silicon carbide, alumina, zirconia, silicon and the like are suitable for this purpose. The adhesion of non-selfbonding materials such as iron, stainless steel and the like, which cannot withstand the high temperatures of the ceramming process, is enhanced by applying such coating materials to a glass-ceramic article that has been previously roughened and cerammed. The adhesion of self-bonding materials is also enhanced by employing the surface roughening and damage healing technique of the present invention. Thus, even though aluminum, for example, can be applied to the smooth surface of a glass-ceramic article, the adhesion thereof will be enhanced by first roughening the surface of the article in accordance with the method of the present invention.

In any of the aforementioned embodiments a second coating of the same or another material can be subsequently applied. For example, a relatively thin layer of coating material can be applied to the roughened surface of a green glass article. After the article has been cerammed, an additional layer of the same material can be applied to provide a coating of the desired thickness. This may be a desirable procedure if the glass-ceramic material is one that shrinks during ceramming. Whereas a thick coating applied to the abraded surface of a green glass article may result in an excessively stressed article after the shrinkage occurs in the ceramming step, a thin layer of the same coating material, which is preferably less than about 0.025 cm thick, may result in an acceptable article. An additional layer of coating material applied after the shrinkage has occurred is obviously unaffected by such shrinkage.

The bond between the substrate and coating is enhanced regardless of the particular abrasion technique employed. Course abrasion by sandblasting to an estimated 0.008 cm r.m.s. finish yields a weak but uniform bond between a glass-ceramic surface and a silicon coating sprayed thereon. An additional threefold increase in adhesion can be obtained by subjecting the surface to a 90 mesh Blanchard grind or gritblast, both of which can give a surface roughness estimated to be about $3 \times 10^{-3}$ cm. The relative weakness of coatings sprayed on coarsely abraded surfaces results from poor bonding over large, smooth fracture areas which occur when chips are broken away by large, e.g. 0.5 mm, sand particles. The more controlled abrasive action of a 90 mesh gritblast or grind produces a surface covered with very small fracture surfaces and many angles and corners. Flame sprayed silicon, for example, is able to more securely interlock with the substrate in the latter case. In general, an optimal condition of surface roughness for thermosprayed coatings can be obtained by grinding or blasting with an abrasive powder of a material such as silicon carbide, the powder being of such a particle size that a surface roughness between about 0.002 cm and 0.005 cm is achieved. The effect of the degree of surface roughness on coating bonding strength is well known in the art. Additional information on this aspect of the coating process may be obtained by referring to the publications: E. Bardal et al., British Corros. Journal, vol. 8, p. 15 (1973) and R. L. Apps, Journal of Vacuum Science and Technology, vol. 11, p. 741 (1974).

The roughened surface of a substrate may be provided with a suitable coating by any well known method such as thermospraying, dipping, brushing or the like, a thermospray technique being preferred. Conventional equipment may be used for thermospraying a coating onto the surface of the glass-ceramic article. During the operation of such equipment, the coating material, which is in wire or powder form, is fed to a plasma or flame gun from which it can be sprayed onto the article to be coated. Suitable flame spraying equipment is described in U.S. Pat. Nos. 3,055,591 and 3,148,818, and plasma spraying equipment is described in U.S. Pat. No. 3,814,620.

Following is a comparison of the durabilities of glass-ceramic skillets coated with silicon by various techniques. Skillets which were sandblasted on the bottom surface after ceramming could not pass the thermal downshock test because of damage imparted thereto. However, when the green glass was sandblasted, provided with a coating of silicon and then cerammed, durability was greatly increased. Typical bond strength for as-sprayed coatings on abraded substrates of glass ceramic material of the type disclosed in U.S. Pat. No. 3,157,522 falls in the range of 1–3 MPa for a flame spray process. Plasma sprayed coatings have bond strengths in the range between 10 and 20 MPa, as do flame sprayed coatings which are applied to a roughened green glass substrate which is then subjected to a ceram schedule. It is theorized that the increase in strength of nearly an order of magnitude is due to the formation of a diffusion or chemical bond between the thermal oxide which coats the silicon particles and the glass on glass-ceramic ware. This extra bonding action, which augments the mechanical bonding of an as-sprayed coating, would be promoted by the higher temperatures reached in the plasma process and in the crystal growth portion of the ceram cycle. An electron microprobe study of the interface between the silicon and the glass-ceramic revealed evidence indicative of the formation of a diffusion bond between the high silica content thermal oxide on the silicon particles and the more complex oxide mixture of the glass-ceramic. If the 10–20 MPa bonding is generated by the same diffusion mechanism in plasma sprayed and in cerammed flame sprayed coatings, it appears that very high temperatures are attained at the coating-substrate interface during a plasma spray operation. It is well known that the plasma itself is highly energenic, but the aforementioned bonding strength indicates that energy transfer to the particles and subsequently to the interface, takes place with reasonable efficiency. If the bonding occurs through a diffusion mechanism, then to obtain the same chemical profile at the interface in a plasma spray process as is found for heat treatment of 1100° C. for two hours (the crystal growth phase of a ceramming process), an extremely high interface temperature would be required, assuming that such a temperature was held for a period of time on the order of a few seconds. It is known that plasma temperatures greater than 6000° C. are obtained in typical spraying operations. Thus, formation of a diffusion bond in addition to mechanical interlocking seems to be the most likely explanation for the increase in bond strength achieved by both plasma spraying and by ceramming after flame spraying. The adhesion of the silicon coating after ceramming was about 10 MPa as compared with an adhesion of about 1.3 MPa for a bond between a roughened glass-ceramic substrate and a flame sprayed silicon coating. Some of the stress to which a coating is subjected during the process of applying the same results from shrinkage of the glass-ceramic during the ceramming process. The glass-ceramic material employed in this test was of the type disclosed in the aforementioned U.S. Pat. No. 3,157,522. This material undergoes a 1.52% linear contraction during the conversion from the green glass state to the glass-ceramic state. Of this contraction, 1.05% is incurred during the transition between the green glass and nucleated states while only 0.47% is incurred during the crystal growth phase. It appears that the thicker coatings, i.e., thicker than about 0.025 cm are excessively unyielding, and internal stresses generated by shrinkage during ceramming cause a degradation of the mechanical and thermal properties of the coated articles. To avoid problems associated with shrinkage, the article can be abraded while in the green state and coated while in the nucleated or the completely cerammed state. An alternative solution is to utilize a glass-ceramic material which undergoes less change in volume during ceramming and to coat such ware prior to the ceramming step. An example of a glass-ceramic composition that undergoes substantially no volume change during ceramming is 50.9% $SiO_2$, 23.2% $Al_2O_3$, 18.5% ZnO and 7.4% $TiO_2$, wherein the percentages given are calculated from the glass batch on the oxide basis. This composition is one of the examples set forth in the aforementioned U.S. Pat. No. 2,920,971.

The process of the present invention may be further understood by reference to the following detailed examples thereof. The glass-ceramic compositions employed in these examples are Corning Code 9608 and Corning Code 9617, the the approximate analyses therefor being set out below in weight percent.

|  | Code 9608 | Code 9617 |
|---|---|---|
| $SiO_2$ | 69.5 | 66.7 |
| $Al_2O_3$ | 17.6 | 20.5 |
| $Li_2O$ | 2.7 | 3.5 |
| MgO | 2.6 | 1.6 |
| ZnO | 1.0 | 1.2 |
| $TiO_2$ | 4.7 | 4.8 |
| $ZrO_2$ | 0.2 | 0.05 |
| $As_2O_3$ | 0.9 | 0.4 |
| F | 0.03 | 0.22 |
| $Fe_2O_3$ | 0.06 | 0.035 |
| $B_2O_3$ | 0.07 | — |
| $MnO_2$ | 0.03 | — |

EXAMPLE 1

A circular glass skillet approximately 4.7 cm in depth, 25 cm in diameter, and having an average bottom thickness of about 0.48 cm, is selected for treatment. This skillet is composed of the lithium alumino-silicate glass referred to hereinabove as Corning Code 9608.

The bottom portion of the skillet which is to be coated is Blanchard ground using 90 mesh SiC abrasive to a surface roughness of approximately 0.003 cm. The roughened surface is then thoroughly cleaned with a commercially-available detergent and rinsed with water to remove all traces of grease, oil, dirt or other foreign matter which could affect bonding. Before the bottom surface of the skillet is coated, it is furnace preheated to about 450° C. A commercially-available Metco Type 2P Thermo Spray Gun is employed to coat the bottom of the skillet with silicon, a steel mask being used to cover the side portions thereof. The spray gun, which employs a hydrogen-oxygen flame produced by combustion of hydrogen and oxygen at flow rates of $3.7 \times 10^6$ cc/hr of hydrogen and $7.7 \times 10^5$ cc/hr of oxygen, has a standoff distance of 18 cm.

Silicon powder is fed into the gun which is mounted in an automatic traverse mechanism. The rate of deposition of silicon is about 20 grams per minute. The silicon powder is commercially available from Kawecki-Berylco Corp. This powder is 98.5% pure and is free flowing, 80% thereof being in the $+200$ to $-325$ mesh (U.S. Standard Sieve) size range. A silicon coating about 0.025 cm in thickness is provided on the skillet bottom by the flame-spray application of this powder in the manner described.

The coated glass skillet is then cerammed by initially heating it from room temperature to 750° C. at the rate of 400° C. per hour. After holding the temperature at 750° C. for ½ hour, it is heated to 1100° C. at the rate of 400° C. per hour. The skillet is then held at a temperature of 1100° C. for 2 hours and thereafter furnace cooled to room temperature.

The silicon-coated skillet prepared as described has excellent thermal shock resistance, withstanding thermal downshock from about 500° C. to cold (8° C.) water without breakage. In fact, the thermal shock resistance of this silicon-coated skillet is not degraded by the coating process, i.e., its thermal shock resistance is essentially the same as that of conventional glass-ceramic skillets having no coating thereon. The coating adhesion is also excellent, being about 7 MPa. Moreover, the silicon remains electrically conductive through the high temperature ceramming cycle.

EXAMPLE 2

A silicon-coated skillet is formed in the manner described in Example 1 except that the silicon powder is manufactured by Cerac-Pure Inc. and the thickness of the silicon coating is about 0.06 cm. The characteristics of this skillet are similar to those of Example 1 except that this skillet exhibits a decreased ability to withstand thermal downshock as measured both by rapid quenching from 500° C. to cold water and by "dunker" testing.

EXAMPLE 3

A silicon-coated skillet is formed in accordance with Example 1 except for the surface roughening and silicon deposition steps. Instead of employing a Blanchard grind, the surface to be coated is roughened by grit blasting with 80 mesh SiC at 70 lbs. air pressure to form a 0.004 cm r.m.s. surface. In the silicon deposition step, the spray gun standoff distance is 16 cm. The characteristics of this skillet are similar to those of the skillet coated in accordance with Example 1.

EXAMPLE 4

A circular glass skillet having a configuration and composition such as described in Example 1 is selected for treatment. The surface to be coated is first grit blasted with 90 mesh SiC at 70 lbs. air pressure until a 0.004 cm surface roughness is achieved. The green glass is then nucleated by subjecting it to a ½ hour heat treatment at 750° C. After being washed with detergent and water, the skillet is subjected to a 450° C. furnace preheat after which the bottom surface thereof is provided with a 0.071 cm thick silicon coating by process similar to that described in Example 1, the gun standoff distance being 16 cm. The resultant silicon coating exhibits an adhesion of about 3.5 MPa, but the thermal durability thereof is poorer than that of Example 1.

EXAMPLE 5

A coated skillet formed in accordance with the method of Example 4 is cerammed by heating the skillet at a rate of 400° C. per hour to 1100° C., maintaining that maximum temperature for 2 hours and then cooling. The nucleating step is performed prior to coating in accordance with the method of Example 4. The coating adhesion increases to about 9.7 MPa.

EXAMPLE 6

A green glass skillet having the dimensions and composition set forth in Example 1 is Blanchard ground as in Example 1 to a surface roughness of 0.004 cm and is thereafter cerammed as in Example 1. The skillet is then furnace-preheated to 550° C. and flame sprayed in accordance with a method similar to that of Example 1. The standoff distance of the gun is 18 cm and the silicon powder employed is of the type described in Example 2.

The silicon coating, which has a thickness of 0.051 cm, exhibits an adhesion of 3.3 MPa.

EXAMPLE 7

A flat 25 cm by 25 cm coupon of Corning Code 9617 glass is grit blasted in the green state with 80 mesh SiC abrasive at 70 lbs. air pressure to form a surface having a 0.004 cm roughness. The coupon is then cerammed on a schedule similar to that of Example 1. Silicon powder of the type employed in Example 1 is used. Without being preheated, the roughened surface is plasma arc sprayed with standard Avco equipment by employing multipass, rotary (spiral) and x-y scanning until a thickness of 0.08 cm is achieved. An argon sheath is employed during spraying to prevent air aspiration and attendant coating oxidation. A strongly adherent coating is achieved.

EXAMPLE 8

A green glass skillet of the type employed in Example 1 is roughened by grit blasting with 80 mesh SiC at 70 lbs. air pressure and is thereafter cerammed in accordance with the schedule employed in Example 1. After the roughened skillet is cerammed, a silicon coating having an average thickness of 0.1 cm is applied by plasma coating as in Example 7. The coating adhesion is 7 MPa. Moreover, the thermal shock resistance of this skillet is excellent, it being able to withstand thermal downshock from 500° C. to cold water and more than 100 cycles of "dunker" testing without breaking.

I claim:

1. In the method of providing a coating on a surface of a glass-ceramic article formed by ceramming a green glass article comprising the steps of
    roughening said surface, and thereafter
    applying a coating to said roughened surface,
    the improvement comprising:
    roughening said green glass article prior to the time that ceramming is initiated, and thereafter
    heating said article to an elevated temperature which is sufficiently high to ceram said article and to substantially heal mechanical damage in said article caused by said roughening step.

2. The method of claim 1 wherein the step of heating said article comprises subjecting said article to a temperature greater than 800° C.

3. The method of claim 1 wherein said article is a skillet and wherein the step of heating said article comprises subjecting said skillet to a temperature greater than 900° C.

4. The method of providing a coating on a surface of a glass-ceramic article comprising:
    providing an article of green glass of such a composition that it is capable of being converted, upon heating, to a glass-ceramic material,
    roughening a surface of said green glass article, thereafter
    applying a coating to said roughened surface of said green glass article, and
    subjecting said green glass article to an elevated temperature for a sufficient period of time to convert said green glass article to a glass-ceramic article and to substantially heal mechanical damage in said article caused by said roughening step.

5. The method of claim 4 wherein said article is a skillet and the step of subjecting said article to an elevated temperature comprises subjecting said article to a temperature greater than 900° C.

6. The method of claim 5 wherein said coating consists of silicon.

* * * * *